United States Patent
Benjebbour

(10) Patent No.: US 9,392,478 B2
(45) Date of Patent: Jul. 12, 2016

(54) RADIO COMMUNICATION SYSTEM, INTERFERENCE MEASUREMENT METHOD, RADIO BASE STATION APPARATUS, AND USER TERMINAL

(71) Applicant: NTT DOCOMO, INC., Tokyo (JP)

(72) Inventor: Anass Benjebbour, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 102 days.

(21) Appl. No.: 14/356,327

(22) PCT Filed: Nov. 7, 2012

(86) PCT No.: PCT/JP2012/078797
§ 371 (c)(1),
(2) Date: May 5, 2014

(87) PCT Pub. No.: WO2013/069665
PCT Pub. Date: May 16, 2013

(65) Prior Publication Data
US 2014/0307577 A1 Oct. 16, 2014

(30) Foreign Application Priority Data
Nov. 8, 2011 (JP) .................................. 2011-244513

(51) Int. Cl.
*H04L 12/66* (2006.01)
*H04W 24/08* (2009.01)
*H04B 17/345* (2015.01)
*H04W 52/24* (2009.01)

(52) U.S. Cl.
CPC ............ *H04W 24/08* (2013.01); *H04B 17/345* (2015.01); *H04W 52/243* (2013.01)

(58) Field of Classification Search
CPC ... H04W 24/08; H04W 52/243; H04B 17/345
IPC ....................................................... H04W 24/08
See application file for complete search history.

(56) References Cited

U.S. PATENT DOCUMENTS

| 2005/0058062 | A1* | 3/2005 | Rudolf | H04W 72/0406 370/216 |
| 2005/0192055 | A1* | 9/2005 | Niemela | H04B 7/12 455/561 |

(Continued)

OTHER PUBLICATIONS

International Search Report issued in PCT/JP2012/078797 mailed on Dec. 11, 2012 (2 pages).

(Continued)

*Primary Examiner* — Robert Wilson
(74) *Attorney, Agent, or Firm* — Osha Liang LLP

(57) ABSTRACT

The present invention is designed to provide a radio communication system, an interference measurement method, a radio base station apparatus, and a user terminal whereby highly accurate interference measurement is possible. A radio communication system according to the present invention includes a user terminal and a radio base station apparatus that is connected to the user terminal, and, in this radio communication system: the radio base station apparatus has: a determining section that determines a subband pattern for interference measurement; and a transmission section that transmits a reporting signal to indicate the determined subband pattern to the user terminal; and the user terminal has: a receiving section that receives the reporting signal and acquires the subband pattern; and
an interference measurement section that performs interference measurement over the entire system band, and, in the interference measurement, averages the interference measurement results in subbands based on the subband pattern.

8 Claims, 10 Drawing Sheets

(56) References Cited

U.S. PATENT DOCUMENTS

| | | | | |
|---|---|---|---|---|
| 2006/0104230 | A1* | 5/2006 | Gidwani | H04W 84/00 370/328 |
| 2007/0079207 | A1* | 4/2007 | Seidel | H04L 1/1845 714/748 |
| 2010/0233963 | A1* | 9/2010 | Harada | H04W 16/14 455/63.3 |
| 2011/0222525 | A1* | 9/2011 | Kishigami | H04J 11/005 370/343 |
| 2013/0142091 | A1* | 6/2013 | Wang | H04L 5/0037 370/281 |
| 2014/0307577 | A1* | 10/2014 | Benjebbour | H04W 52/243 370/252 |
| 2015/0018034 | A1* | 1/2015 | Nagata | H04B 7/0626 455/524 |
| 2015/0043477 | A1* | 2/2015 | Nagata | H04B 7/024 370/329 |
| 2015/0085770 | A1* | 3/2015 | Nagata | H04W 24/10 370/329 |
| 2015/0110032 | A1* | 4/2015 | Nagata | H04B 7/024 370/329 |
| 2015/0229454 | A1* | 8/2015 | Takeda | H04W 72/042 370/329 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN); (Release 7)"; Sep. 2006 (57 pages).

Office Action issued in corresponding Japanese Application No. 2011-244513, mailed Aug. 25, 2015 (5 pages).

Huawei et al.; "Signaling and UE Behaviors for Resource-Specific CSI Measurements"; 3GPP TSG RAN WG1 meeting #63, R1-105852; Jacksonville, USA; Nov. 15-Nov. 19, 2010 (4 pages).

Potevio; "Further Consideration on Two Scenarios of Non CA-based ICIC"; 3GPP TSG RAN2 Meeting #75, R2-114146; Athens, Greece; Aug. 22-Aug. 26, 2011 (3 pages).

Huawei, HiSilicon; "Measurement Definitions for Resource-Restricted Measurements"; 3GPP TSG RAN WG1 Meeting #63bis, R1-110020; Dublin, Ireland; Jan. 17-21, 2011 (6 pages).

Office Action in counterpart Japanese Patent Application No. 2011-244513 issued Jan. 7, 2016 (5 pages).

* cited by examiner

RADIO COMMUNICATION SYSTEM, INTERFERENCE MEASUREMENT METHOD, RADIO BASE STATION APPARATUS, AND USER TERMINAL

TECHNICAL FIELD

The present invention relates to a radio communication system, an interference measurement method, a radio base station apparatus and a user terminal that are applicable to a cellular system and so on.

BACKGROUND ART

In the UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (see, for example, non-patent literature 1).

In the third-generation system, it is possible to achieve a transmission rate of maximum approximately 2 Mbps on the downlink by using a fixed band of approximately 5 MHz. In the LTE system, it is possible to achieve a transmission rate of about maximum 300 Mbps on the downlink and about 75 Mbps on the uplink by using a variable band that ranges from 1.4 MHz to 20 MHz. In the UMTS network, a successor system of the LTE system (referred to as, for example, "LTE-Advanced" or "LTE enhancement" (hereinafter referred to as "LTE-A")) is under study, for the purposes of further broadbandization and higher speed.

In downlink of the LTE system (for example, Rel. 8), the CRS (Cell-specific Reference Signal) is defined. This CRS is used to demodulate user data, and, besides, used to measure downlink channel quality (CQI: Channel Quality Indicator) for scheduling and adaptive control, and so on. In the successor system of LTE (for example, Rel. 10), on the downlink, the CSI-RS (Channel State Information-Reference Signal) is defined as a reference signal for determining CSI (Channel State Information), including CQIs, PMIs (Precoding Matrix Indicators) and RIs (Rank Indicators).

CITATION LIST

Non-Patent Literature

Non-Patent Literature 1: 3GPP, TR25.912 (V7.1.0), "Feasibility Study for Evolved UTRA and UTRAN," September 2006

SUMMARY OF THE INVENTION

Technical Problem

In the LTE system and the LTE-A system, downlink scheduling and adaptive control are executed based on CQIs. For this reason, the accuracy of CQI measurement is important for improvement of communication quality. A CQI is represented, for example, by the following equation. In this equation, "S" stands for the received signal component (power) of the desired wave from the connecting transmission point, "I" stands for the interference component (power) received from other transmission points, and "N" stands for the noise component (power).

$$CQI=S/(I+N)$$

As shown in the above equation, the CQI includes the interference component "I" from other transmission points as a parameter, so that, to allow CQI measurement of high accuracy, it is necessary to improve the accuracy of the calculation of the interference component "I" from other transmission points. However, with the present interference measurement method, it is not always possible to realize highly accurate interference measurement.

The present invention has been made in view of the above, and it is therefore an object of the present invention to provide a radio communication system, an interference measurement method, a radio base station apparatus, and a user terminal whereby highly accurate interference measurement is possible.

Solution to Problem

A radio communication system according to the present invention is a radio communication system to include a user terminal and a radio base station apparatus to which the user terminal is connected, and, in this radio communication system: the radio base station apparatus has: a determining section that determines a subband pattern for interference measurement; and a transmission section that transmits a reporting signal to indicate the determined subband pattern to the user terminal; and the user terminal has: a receiving section that receives the reporting signal and acquires the subband pattern an interference measurement section that performs interference measurement over an entire system band, and, in the interference measurement, averages interference measurement results in subbands, based on the subband pattern.

Also, a radio communication system according to the present invention is a radio communication system to include a user terminal and a radio base station apparatus to which the user terminal is connected, and, in this radio communication system: the radio base station apparatus has: an acquisition section that acquires, from a plurality of transmission points, radio resource allocation information to represent a signal transmission state at each transmission point, over an entire system band; a determining section that determines a subband pattern to indicate subbands where the signal transmission state is the same between the plurality of transmission points, based on the acquired radio resource allocation information; and a transmission section that transmits a reporting signal to indicate the determined subband pattern to the user terminal; and the user terminal has: a receiving section that receives the reporting signal and acquires the subband pattern; and an interference measurement section that performs interference measurement over the entire system band, and, in the interference measurement, averages interference measurement results in the subbands, based on the subband pattern.

An interference measurement method according to the present invention is an interference measurement method for measuring interference in a user terminal connected to a radio base station apparatus, and this method includes the steps in which: the radio base station apparatus determines a subband pattern for interference measurement; the radio base station apparatus transmits a reporting signal to indicate the determined subband pattern, to the user terminal; the user terminal receives the reporting signal and acquires the subband pattern; and the user terminal performs interference measurement over an entire system band, and, in the interference measurement, averages interference measurement results in subbands, based on the subband pattern.

Also, an interference measurement method according to the present invention is an interference measurement method for measuring interference in a user terminal connected to a radio base station apparatus, and this method includes the steps in which: the radio base station apparatus acquires, from a plurality of transmission points, radio resource allocation information to represent a signal transmission state at each transmission point, over an entire system band; the radio base station apparatus determines a subband pattern to indicate subbands where the signal transmission state is the same between the plurality of transmission points, based on the acquired radio resource allocation information; the radio base station apparatus transmits a reporting signal to indicate the determined subband pattern to the user terminal; the user terminal receives the reporting signal and acquires the subband pattern; and the user terminal performs interference measurement over the entire system band, and, in the interference measurement, averages interference measurement results in the subbands, based on the subband pattern.

A radio base station apparatus according to the present invention is a radio base station apparatus to which a user terminal to measure interference is connected, and this radio base station apparatus has: a determining section that determines a subband pattern for interference measurement; and a transmission section that transmits a reporting signal to indicate the determined subband pattern to the user terminal.

Also, a radio base station apparatus according to the present invention is a radio base station apparatus to which a user terminal to measure interference is connected, and this radio base station apparatus has: an acquisition section that acquires, from a plurality of transmission points, radio resource allocation information to represent a signal transmission state at each transmission point, over an entire system band; a determining section that determines a subband pattern to indicate subbands where the signal transmission state is the same between the plurality of transmission points, based on the acquired radio resource allocation information; and a transmission section that transmits a reporting signal to indicate the determined subband pattern to the user terminal.

A user terminal according to the present invention is a user terminal that is connected to a radio base station apparatus, and this user terminal has: a receiving section that acquires a subband pattern for interference measurement; and an interference measurement section that performs interference measurement over an entire system band, and, in the interference measurement, averages interference measurement results in subbands, based on the subband pattern.

Also, a user terminal according to the present invention is a user terminal that is connected to a radio base station apparatus, and this user terminal has: a receiving section that receives a reporting signal to indicate a subband pattern that indicates subbands where a signal transmission state is the same between a plurality of transmission points; and an interference measurement section that performs interference measurement over an entire system band, and, in the interference measurement, averages interference measurement results in the subbands, based on the subband pattern.

Technical Advantage of the Invention

According to the present invention, it is possible to provide a radio communication system, an interference measurement method, a radio base station apparatus, and a user terminal whereby highly accurate interference measurement is possible.

DESCRIPTION OF EMBODIMENTS

First, CQI measurement in the LTE system and the LTE-A system (hereinafter reoffered to as "LTE system," covering the LTE-A system as well, unless specified otherwise) will be described. In the LTE system, a user terminal, for example, performs interference measurement by receiving transmission signals transmitted from other transmission points, and performs channel estimation by receiving reference signals such as the CRS, the CSI-RS and so on, transmitted from the connecting transmission point. The user terminal calculates the CQI from the interference measurement and channel estimation results. As for the mode of CQI measurement, there are, for example, wideband CQI, subband CQI, best-M average and so on.

As described above, the CQI that is measured in the LTE system is represented by the following equation, so that, to allow highly accurate CQI measurement, it is important to improve the accuracy of measurement of the interference component "I" from other transmission points.

$$CQI=S/(I+N)$$

Figure 1:
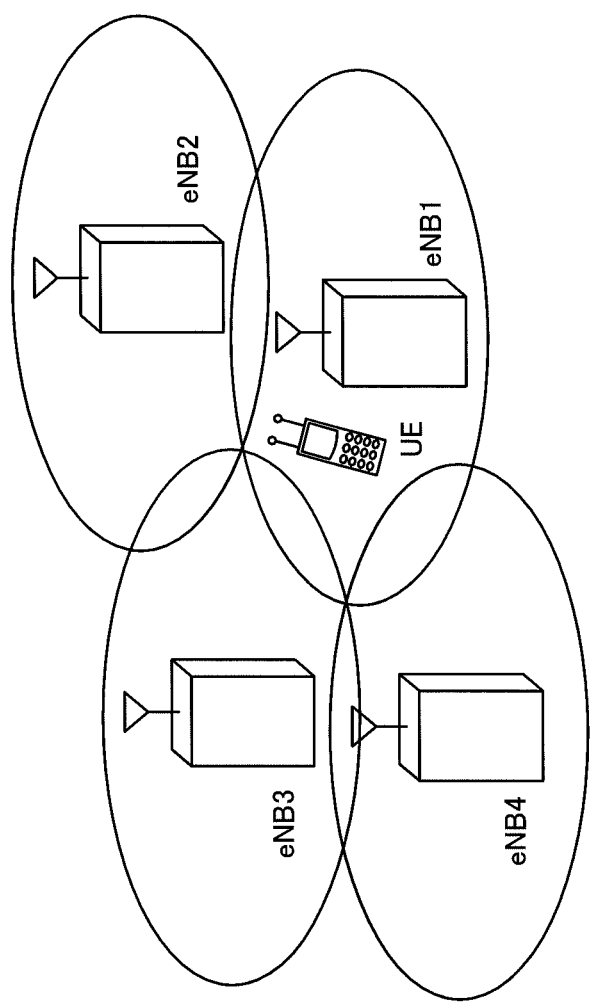
FIG. 1 is a schematic diagram to show an example of the state of a system related to interference measurement.
Figure 2:
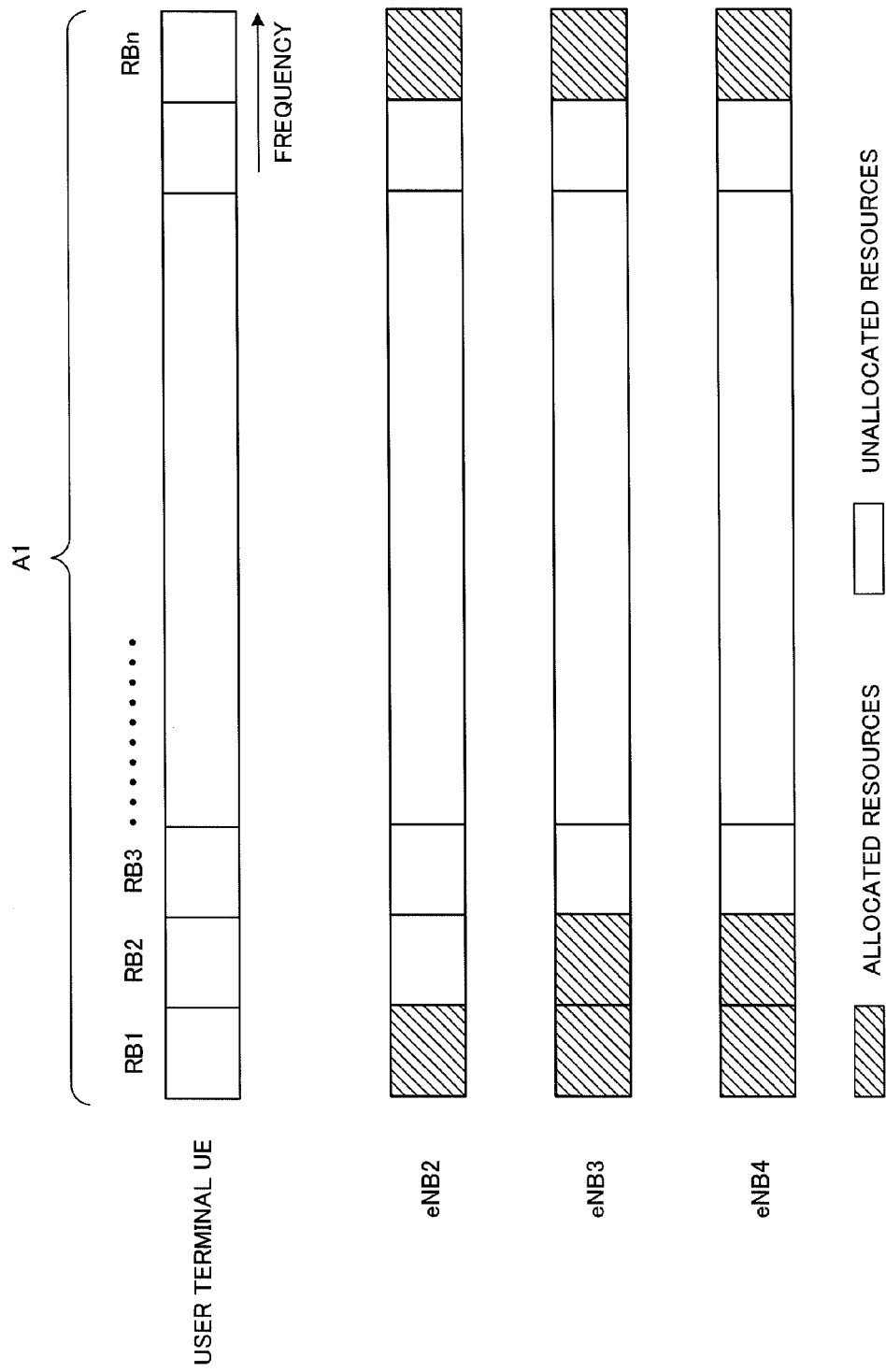
FIG. 2 is a schematic diagram to show an example of a downlink radio resource allocation state at individual transmission points.

FIG. 1 is a schematic diagram to show an example of the state of a radio communication system related to interference measurement, and FIG. 2 is a schematic diagram to show an example of a downlink radio resource allocation state at individual transmission points. In the radio communication system shown in FIG. 1, a user terminal UE is connected to the radio base station apparatus eNB 1. User terminals, which are not illustrated, are connected to the radio base station apparatuses eNB 2 to eNB 4, respectively. The radio base station apparatuses eNB 2 to eNB 4 perform downlink transmission using radio resources to be interference against the user terminal UE. The user terminal UE acquires the above interference component "I" by measuring interference from other transmission points, in each resource block of the radio resources allocated from the radio base station apparatus eNB 1, and averaging the measurement results over the whole band A1 (see FIG. 2).

As shown in FIG. 2, not all bands that are allocated from the radio base station apparatus eNB 1 to the user terminal UE are necessarily allocated in the same way at other transmission points. For example, given all the frequency bands which the user terminal UE uses on the downlink, the resource block RB 1 is allocated in the radio base station apparatuses eNB 2 to eNB 4, but the resource block RB 3 is not allocated in the radio base station apparatuses eNB 2 to eNB 4. In this case, the user terminal UE receives no interference from the radio base station apparatuses eNB 2 to eNB 4 in the resource block RB 3. In this way, the pattern of interference varies between bands where the state of radio resource allocation at other transmission points vary (for example, between the resource blocks RB 1 and RB 2 in FIG. 2), and, consequently, the accuracy of interference measurement becomes lower if interference measurement results are averaged in all bands including such bands. That is, the problem of making the accuracy of interference measurement lower by averaging interference measurement results in all frequency bands which the user terminal uses arises, like when all bands are used (full buffer) even though there are radio resources that are not used at other transmission points (non-full buffer).

The present inventors have focused on this point and found out that it is possible to improve the accuracy of interference measurement by averaging only the interference measurement results in radio resources having the same radio resource allocation pattern at other transmission points, when all bands which a user terminal uses on the downlink are not allocated at other transmission points (interfering cells) (non-full buffer).

That is to say, a gist of the present invention is that radio resources having the same radio resource allocation pattern at other transmission points are reported from a radio base station apparatus to a user terminal that performs interference measurement, and the user terminal averages the interference measurement results based on the radio resource allocation pattern that is reported. Now, specific modes will be described below.

First Mode

Figure 3:
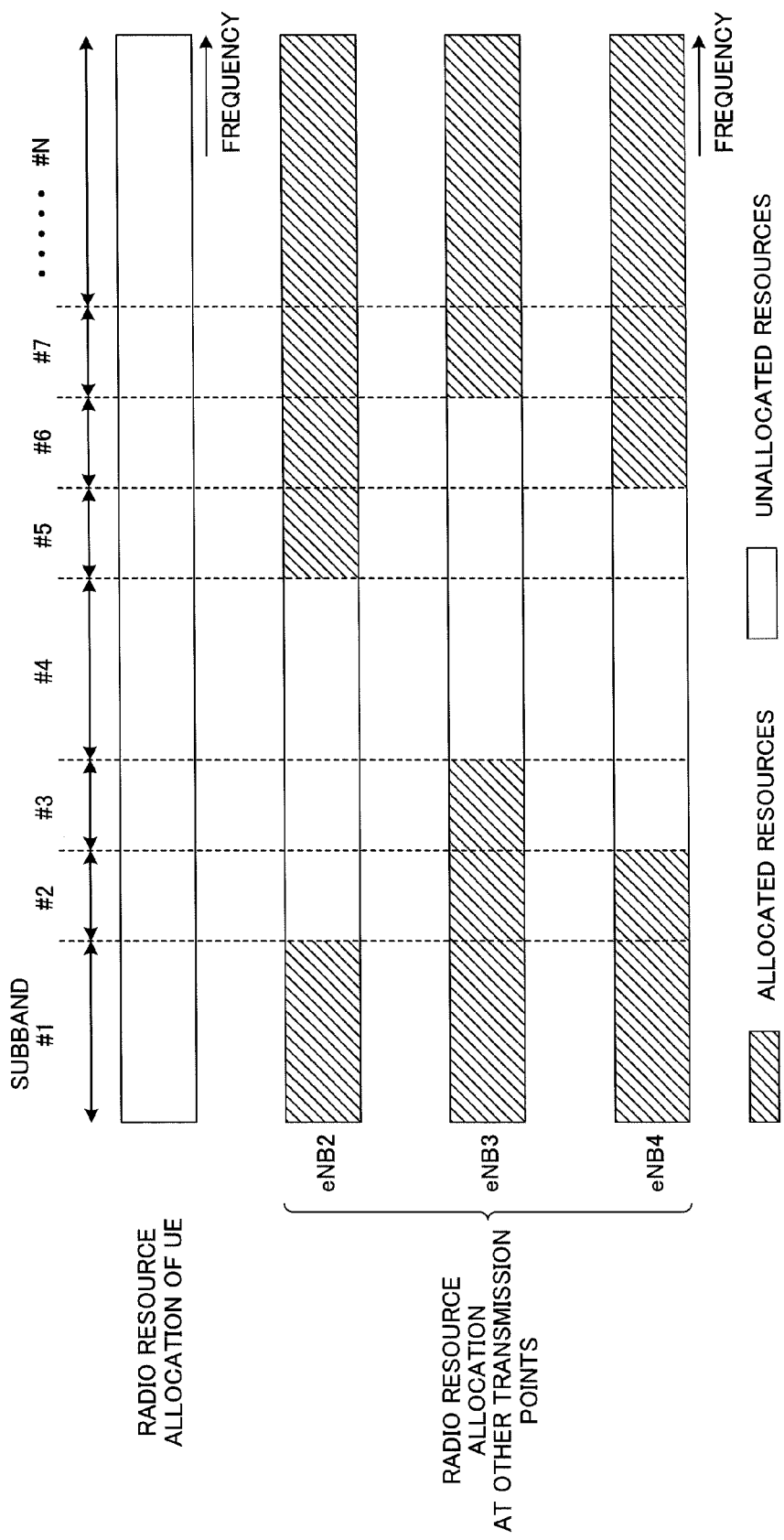
FIG. 3 is a schematic diagram to show a downlink radio resource allocation state, to explain an interference measurement method according to the first mode.

FIG. 3 is a schematic diagram to show a downlink radio resource allocation state, to explain an interference measurement method according to the first mode. FIG. 3 shows a state where a user terminal UE to perform interference measurement is connected to the radio base station apparatus eNB 1, and where radio resources to be used on the downlink are allocated from the radio base station apparatus eNB 1 to the user terminal UE. In FIG. 3, frequency bands are shown numbered as #1 to #N, depending on the situation of radio resource allocation at other transmission points (the radio base station apparatuses eNB 2 to eNB 4). Subbands #1 to #N are each formed with one resource block or a plurality of resource blocks.

In the case shown in FIG. 3, at other transmission points, only part of subbands #1 to #N is allocated, and part of the subbands is not subject to signal transmission (non-full buffer). For example, in the radio base station apparatus eNB 2, subbands #1 and #5 to #N are allocated, but subbands #2 to #4 are not allocated. Also, in the radio base station apparatus eNB 3, subbands #1 to #3 and #7 to #N are allocated, but subbands #4 to #6 are not allocated. Also, in the radio base station apparatus eNB 4, subbands #1, #2 and #6 to #N are allocated, but subbands #3 to #5 are not allocated.

Given this state, even if interference measurement is performed in all frequency bands which the user terminal UE uses and the measurement results are averaged in all of the frequency bands, it is still not possible to acquire an adequate interference measurement result. For example, in the state shown in FIG. 3, although there is interference from other transmission points in subband #1, there is no interference from other transmission points in subband #4. In this way, when the interference measurement results in subbands #1 and #4, which have different radio resource allocation patterns at other transmission points, are averaged, the accuracy of interference measurement becomes lower. To prevent the accuracy of interference measurement from lowering, it is necessary to perform averaging separately between subband #1, where severe interference is predicted, and subband #4, where zero interference is predicted.

So, with the interference measurement method according to the present invention, interference measurement results are averaged by separating all bands that are allocated to a user terminal UE, into bands that are suitable for averaging of interference measurement results. To realize this, the radio base station apparatus eNB 1, which is the user terminal UE's connecting transmission point, reports radio resources having the same radio resource allocation pattern at other transmission points, to the user terminal UE. To be more specific, the radio base station apparatus eNB 1 determines radio resources having the same radio resource allocation pattern at other transmission points, and reports the bandwidth (frequency band) and frequency position to the user terminal UE, for each pattern. This reporting can be made using higher layer signaling. The user terminal UE averages interference the measurement results for every reported pattern. By this means, the user terminal UE is able to average interference measurement results in bands that are suitable for averaging interference measurement results, so that it is possible to improve the accuracy of interference measurement.

Radio resources having the same radio resource allocation pattern at other transmission points can be determined based on radio resource allocation information regarding other connecting points. To be more specific, for example, the radio base station apparatus eNB 1 is able to determine bands that are suitable for averaging interference measurement results, based on the RNTPs (Relative Narrowband Tx Power) reported from the radio base station apparatuses eNB 2 to eNB 4 by backhaul. However, the RNTP is by no means limiting, and it is equally possible to use any information that relates to radio resource allocation at other connecting points as well.

In the state shown in FIG. 3, subband #1 and subbands #7 to #N assume a state where signals are transmitted in all of the radio base station apparatuses eNB 2 to eNB 4. That is to say, subband #1 and subbands #7 to #N assume a state in which radio resources are allocated at all the other transmission points. Consequently, in subbands #1 and subbands #7 to #N, interference against the user terminal UE is produced from all of the radio base station apparatuses eNB 2 to eNB 4. In this case, the radio base station apparatuses eNB 2 to eNB 4 each report an RNTP, which indicates that high power transmission is executed in subband #1 and subbands #7 to #N, to the radio base station apparatus eNB 1.

The radio base station apparatus eNB 1, having received such report, determines subband #1 and subbands #7 to #N to be bands having a pattern in which radio resources are allocated in all of the radio base station apparatuses eNB 2 to eNB 4 (this pattern is, for example, pattern 1). Then, subband #1 and subbands #7 to #N that are determined to have pattern 1 are determined to be a subband pattern in which the state of radio resource allocation at other transmission points is the same, and this subband pattern is reported to the user terminal UE. To be more specific, according to the first mode, the bandwidth of subbands is variable, and therefore the radio base station apparatus eNB 1 reports the bandwidths and frequency positions of subbands #1 and #7 to #N of a subband pattern of the same state, to the user terminal UE. The user terminal UE performs interference measurement in all bands, on a per resource block basis, and averages the interference measurement results in subbands #1 and #7 to #N reported as a subband pattern of the same state.

For example, subband #2 is not allocated in the radio base station apparatus eNB 2, but is allocated in the radio base station apparatuses eNB 3 and eNB 4. In this case, the radio base station apparatus eNB 2 reports an RNTP, which indicates that low power transmission (or non-transmission) is executed in subband #2, to the radio base station apparatus eNB 1. Also, the radio base station apparatuses eNB 3 and eNB 4 each report an RNTP, which indicates that high power transmission is executed in subband #2, to the radio base station apparatus eNB 1. Then, the radio base station apparatus eNB 1 determines subband #2 to have a pattern in which radio resources are allocated in the radio base station apparatuses eNB 3 and eNB 4 and in which radio resources are not allocated in the radio base station apparatus eNB 2 (this pattern is, for example, pattern 2). No other bands besides subband #2 have pattern 2. Consequently, the radio base station apparatus eNB 1 determines only subband #2 to be a subband pattern having the same state of radio resource allocation at other transmission points, and reports this subband pattern to the user terminal UE. To be more specific, the radio base station apparatus eNB 1 reports the bandwidth and frequency position of subband #2 having a subband pattern of the same state, to the user terminal UE. The user terminal UE averages the interference measurement results, measured on a per resource block basis, in subband #2 that is reported as a subband pattern to have the same state.

For example, subband #3 is not allocated in the radio base station apparatuses eNB 2 and eNB 4, but is allocated in the radio base station apparatus eNB 3. In this case, the radio base station apparatuses eNB 2 and eNB 4 each report an RNTP, which indicates that low power transmission (or non-transmission) is executed in subband #3, to the radio base station apparatus eNB 1. Also, the radio base station apparatuses eNB 3 reports an RNTP, which indicates that high power transmission is executed in subband #3, to the radio base station apparatus eNB 1. Then, the radio base station apparatus eNB 1 determines subband #3 to have a pattern in which radio resources are allocated in the radio base station apparatus eNB 3 and in which radio resources are not allocated in the radio base station apparatuses eNB 2 and eNB 4 (this pattern is, for example, pattern 3). No other bands besides subband #3 have pattern 3. Consequently, the radio base station apparatus eNB 1 determines only subband #3 to be a subband pattern having the same state of radio resource allocation at other transmission points, and reports this subband pattern to the user terminal UE. To be more specific, the radio base station apparatus eNB 1 reports the bandwidth and frequency position of subband #3 having a subband pattern of the same state, to the user terminal UE. The user terminal UE averages the interference measurement results, measured on a per resource block basis, in subband #3 that is reported as a subband pattern to have the same state.

For example, subband #4 is not allocated in any of the radio base station apparatuses eNB 2 to eNB 4. In this case, the radio base station apparatuses eNB 2 to eNB 4 each report an RNTP, which indicates that low power transmission (or non-transmission) is executed in subband #4, to the radio base station apparatus eNB 1. Then, the radio base station apparatus eNB 1 determines subband #4 to be a band having a pattern in which radio resources are not allocated in any of the radio base station apparatuses eNB 2 to eNB 4 (this pattern is, for example, pattern 4). No other bands besides subband #4 have a pattern in which radio resources are not allocated in any of the radio base station apparatuses eNB 2 to eNB 4. Consequently, the radio base station apparatus eNB 1 determines only subband #4 to be a subband pattern having the same state of radio resource allocation at other transmission points, and reports this subband pattern to the user terminal UE. To be more specific, the radio base station apparatus eNB 1 reports the bandwidth and frequency position of subband #4, which is a subband pattern of the same state, to the user terminal UE. The user terminal UE averages the interference measurement results, which are measured on a per resource block basis, in subband #4, reported as a subband pattern to have the same state.

For example, subband #5 is not allocated in the radio base station apparatuses eNB 3 and eNB 4, but is allocated in the radio base station apparatus eNB 2. In this case, the radio base station apparatuses eNB 3 and eNB 4 each report an RNTP, which shows that low power transmission (or non-transmission) is executed in subband #5, to the radio base station apparatus eNB 1. Also, the radio base station apparatuses eNB 2 reports an RNTP, which indicates that high power transmission is executed in subband #5, to the radio base station apparatus eNB 1. Then, the radio base station apparatus eNB 1 determines subband #5 to have a pattern in which radio resources are allocated in the radio base station apparatuses eNB 2 and in which radio resources are not allocated in the radio base station apparatuses eNB 3 and eNB 4 (this pattern is, for example, pattern 5). No other bands besides subband #5 have pattern 5. Consequently, the radio base station apparatus eNB 1 determines only subband #5 to be a subband pattern having the same state of radio resource allocation at other transmission points, and reports this subband pattern to the user terminal UE. To be more specific, the radio base station apparatus eNB 1 reports the bandwidth and frequency position of subband #5, which is a subband pattern of the same state, to the user terminal UE. The user terminal UE averages the interference measurement results, which are measured on a per resource block basis, in subband #5, reported as a subband pattern to have the same state.

For example, subband #6 is not allocated in the radio base station apparatuses eNB 3, but is allocated in the radio base station apparatuses eNB 2 and eNB 4. In this case, the radio base station apparatus eNB 3 reports an RNTP, which indicates that low power transmission (or non-transmission) is executed in subband #6, to the radio base station apparatus eNB 1. Also, the radio base station apparatuses eNB2 and eNB 4 each report an RNTP, which indicates that high power transmission is executed in subband #6, to the radio base station apparatus eNB 1. Then, the radio base station apparatus eNB 1 determines subband #6 to have a pattern in which radio resources are allocated in the radio base station apparatuses eNB 2 and eNB 4 and in which radio resources are not allocated in the radio base station apparatus eNB 3 (this pattern is, for example, pattern 6). No other bands besides subband #6 have pattern 6. Consequently, the radio base station apparatus eNB 1 determines only subband #6 to be a subband pattern having the same state of radio resource allocation at other transmission points, and reports this subband pattern to the user terminal UE. To be more specific, the radio base station apparatus eNB 1 reports the bandwidth and frequency position of subband #6 having a subband pattern of the same state, to the user terminal UE. The user terminal UE averages the interference measurement results, measured on a per resource block basis, in subband #6 that is reported as a subband pattern to have the same state.

In this way, the radio base station apparatus eNB 1 reports radio resources having the same radio resource allocation patterns at other transmission points to the user terminal UE, so that the user terminal UE is able to average interference measurement results for every band that is suitable for averaging. According to the first mode, the bandwidth of subbands is variable, so that it is possible to adequately report subband patterns in which the state of radio resource allocation at other transmission points is the same, and improve the accuracy of interference measurement.

Note that the subbands to be used to calculate the CQI and the subbands to be used for the above-described averaging of interference measurement results (for example, subbands to have the same state of radio resource allocation at other transmission points) are different. The subbands to be used to calculate the CQI define the granularity of channel quality which the user terminal UE reports to the radio base station apparatus eNB, while the subbands to be used to average interference measurement results define the range of averaging in relationship to interference measurement. However, the range of these subbands may be the same as well.

Second Method

Now, the differences from the first mode will be mainly described, and points that are common with the first mode will be skipped. Various configurations that have been shown with the first mode will apply likewise to the second mode as well.

Figure 4:
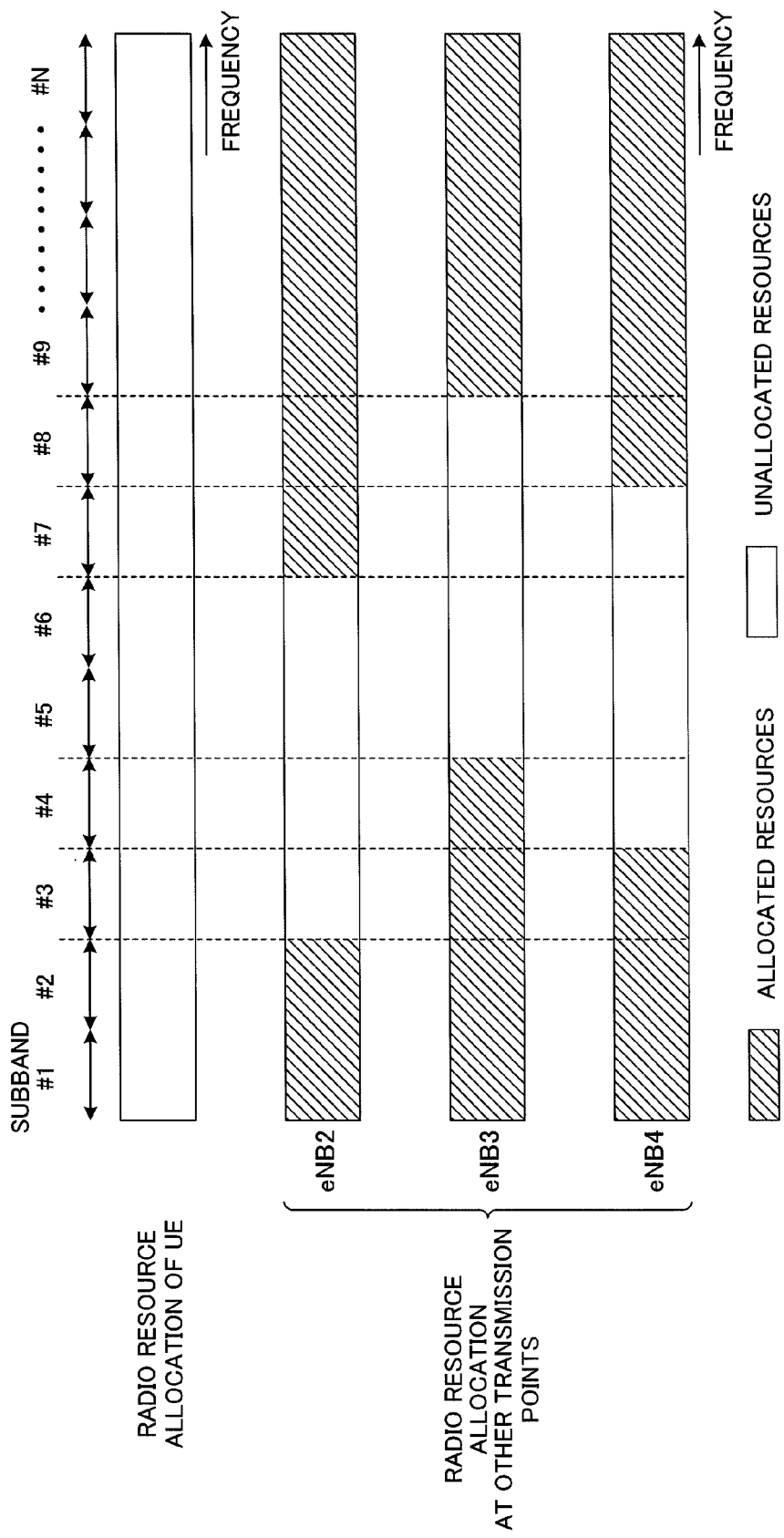
FIG. 4 is a schematic diagram to show a downlink radio resource allocation state, to explain an interference measurement method according to a second mode.

FIG. 4 is a schematic diagram to show a downlink radio resource allocation state, to explain an interference measurement method according to the second mode. FIG. 4 shows a state where a user terminal UE to perform interference measurement is connected to the radio base station apparatus eNB 1 and where radio resources to be used on the downlink are allocated from the radio base station apparatus eNB 1 to the user terminal UE. Also, FIG. 4 shows a state in which the frequency bands which the user terminal uses are divided into a fixed bandwidth and are shown numbered as #1 to #N. Subbands #1 to #N are each formed with one resource block or a plurality of resource blocks.

In the case shown in FIG. 4, the radio base station apparatuses eNB 2 to eNB 4 transmit signals only in part of subbands #1 to #N. For example, in the radio base station apparatus eNB 2, subbands #1, #2, and #7 to #N are allocated, but subbands #3 to #6 are not allocated. Also, in the radio base station apparatus eNB 3, subbands #1 to #4 and #9 to #N are allocated, but subbands #5 to #8 are not allocated. Also, in the radio base station apparatus eNB 4, subbands #1 to #3 and #8 to #N are allocated, but subbands #4 to #7 are not allocated.

To realize this, the radio base station apparatus eNB 1, which is the user terminal UE's connecting transmission point, reports radio resources having the same radio resource allocation pattern at other transmission points, to the user terminal UE. To be more specific, the radio base station apparatus eNB 1 determines radio resources having the same radio resource allocation pattern at other transmission points, and reports the frequency position to the user terminal UE, for each pattern.

For example, the state shown in FIG. 4 is a state in which subbands #1 and #2 and subbands #9 to #N assume a state in which the radio base station apparatuses eNB 2 to eNB 4 are all transmitting signals. That is to say, subbands #1 and #2 and subbands #9 to #N assume a state in which radio resources are allocated in all the other transmission points. Consequently, in subbands #1 and #2, and subbands #9 to #N, interference against the user terminal UE is produced from all of the radio base station apparatuses eNB 2 to eNB 4. In this case, the radio base station apparatuses eNB 2 to eNB 4 each report an RNTP, which indicates that high power transmission is executed in subbands #1 and #2 and subbands #9 to #N, to the radio base station apparatus eNB 1.

The radio base station apparatus eNB 1 having received such report determines that subbands #1 and #2 and subbands #9 to #N are bands that have a pattern in which radio resources are allocated in all of the radio base station apparatuses eNB 2 to eNB 4. Then, subbands #1 and #2 and subbands #9 to #N, which are determined to be the pattern, are determined to be a subband pattern in which the state of radio resource allocation at other transmission points is the same, and this subband pattern is reported to the user terminal UE. The user terminal UE performs interference measurement in all bands, on a per resource block basis, and the interference measurement results are averaged in subbands #1 and #2 and subbands #9 to #N, reported as a subband pattern to have the same state. According to the second mode, the bandwidth of subbands is fixed, so that the radio base station apparatus eNB 1 reports the frequency positions of subbands #1 and #2 and subbands #9 to #N to the user terminal UE. That is, according to the second mode, subband patterns to have the same state of radio resource allocation at other transmission points are reported using frequency positions alone. This reporting can be made using higher layer signaling. In this way, when the bandwidth of subbands is fixed, a subband pattern can be reported using frequency positions alone, so that it is possible to reduce the amount of communication related to reporting.

According to the second mode, it is also possible to report subband patterns having the same state of radio resource allocation at other transmission points by frequency positions as described above, or it is equally possible to report by other methods as well.

Note that it is also possible to switch between and use the above-described first mode and second mode. For example, it is possible to switch between the first mode and the second mode depending on the situation of radio resource allocation at other transmission points (for example, the radio base station apparatuses eNB 2 to eNB 4 in FIG. 3 and FIG. 4). In this case, for example, switch may be reported to the user terminal UE by higher layer signaling.

Figure 5:
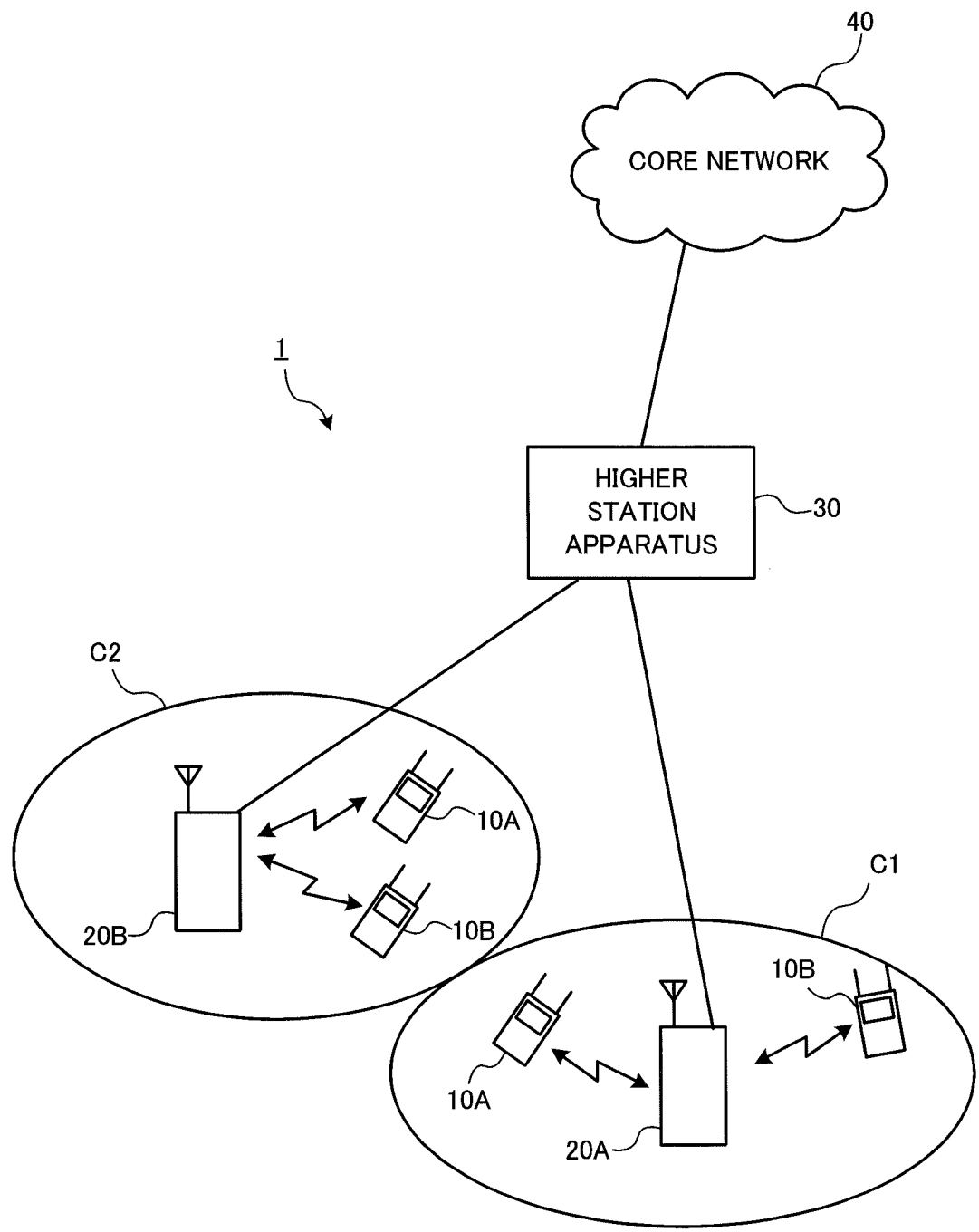
FIG. 5 is a diagram to explain a system configuration of a radio communication system.

Now, an embodiment of the present invention will be described below in detail. FIG. 5 is a diagram to explain a system configuration of a radio communication system according to the present embodiment. Note that the radio communication system shown in FIG. 5 is a system to accommodate, for example, the LTE system or the LTE-A system. In this radio communication system, carrier aggregation, which groups a plurality of fundamental frequency blocks into one, where the system band of the LTE system is one unit, is used. Also, this radio communication system may be referred to as "IMT-Advanced" or may be referred to as "4G."

As shown in FIG. 5, a radio communication system 1 is configured to include radio base station apparatuses 20A and 20B and a plurality of mobile terminal apparatuses 10A and 10B that communicate with these radio base station apparatuses 20A and 20B. The radio base station apparatuses 20A and 20B are connected with a higher station apparatus 30, and this higher station apparatus 30 is connected with a core network 40. Also, the radio base station apparatuses 20A and 20B are connected with each other via an X2 interface (not shown). The mobile terminal apparatuses 10A and 10B are able to communicate with the radio base station apparatuses 20A and 20B in cells C1 and C2. The cell IDs of the radio base station apparatuses 20A and 20B may be the same or may be different. However, the radio base station apparatuses 20A and 20B are separate transmission points. Note that the higher station apparatus 30 includes, for example, an access gateway apparatus, a radio network controller (RNC), a mobility management entity (MME) and so on, but is by no means limited to these.

The mobile terminal apparatuses 10A and 10B include LTE terminals and LTE-A terminals. Also, although, for ease of explanation, the radio base station apparatuses 20A and 20B and the mobile terminal apparatuses 10A and 10B will be described to perform radio communication, more generally, user terminals (UE: User Equipment), including fixed terminal apparatuses, may be used as well. Note that the mobile terminal apparatuses 10A and 10B have the same configuration and therefore will be described simply as "mobile terminal apparatus 10." Also, the radio base station apparatuses 20A and 20B have the same configuration and therefore will be described simply as "radio base station apparatus 20."

For radio access schemes, in the radio communication system 1, OFDMA (Orthogonal Frequency Division Multiple Access) is adopted on the downlink and SC-FDMA (Single-Carrier Frequency Division Multiple Access) is adopted on the uplink, but the radio access schemes are by no means limited to these. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Now, communication channels in the radio communication system 1 will be described. The downlink communication channels include a PDSCH (Physical Downlink Shared CHannel), which is used by the mobile terminal apparatuses 10A and 10B on a shared basis as a downlink data channel, and downlink L1/L2 control channels (PDCCH, PCFICH, PHICH). User data and higher control information are transmitted by the PDSCH. PDSCH and PUSCH (Physical Uplink Shared Channel) scheduling information and so on are transmitted by the PDCCH (Physical Downlink Control CHannel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel).

The uplink communication channels include a PUSCH, which is used by each mobile terminal apparatus on a shared basis as an uplink data channel, and a PUCCH (Physical Uplink Control Channel), which is an uplink control channel. User data and higher control information are transmitted by this PUSCH. Also, by means of the PUCCH, downlink radio quality information (CQI: Channel Quality Indicator), ACK/NACK and so on are transmitted.

Figure 6:
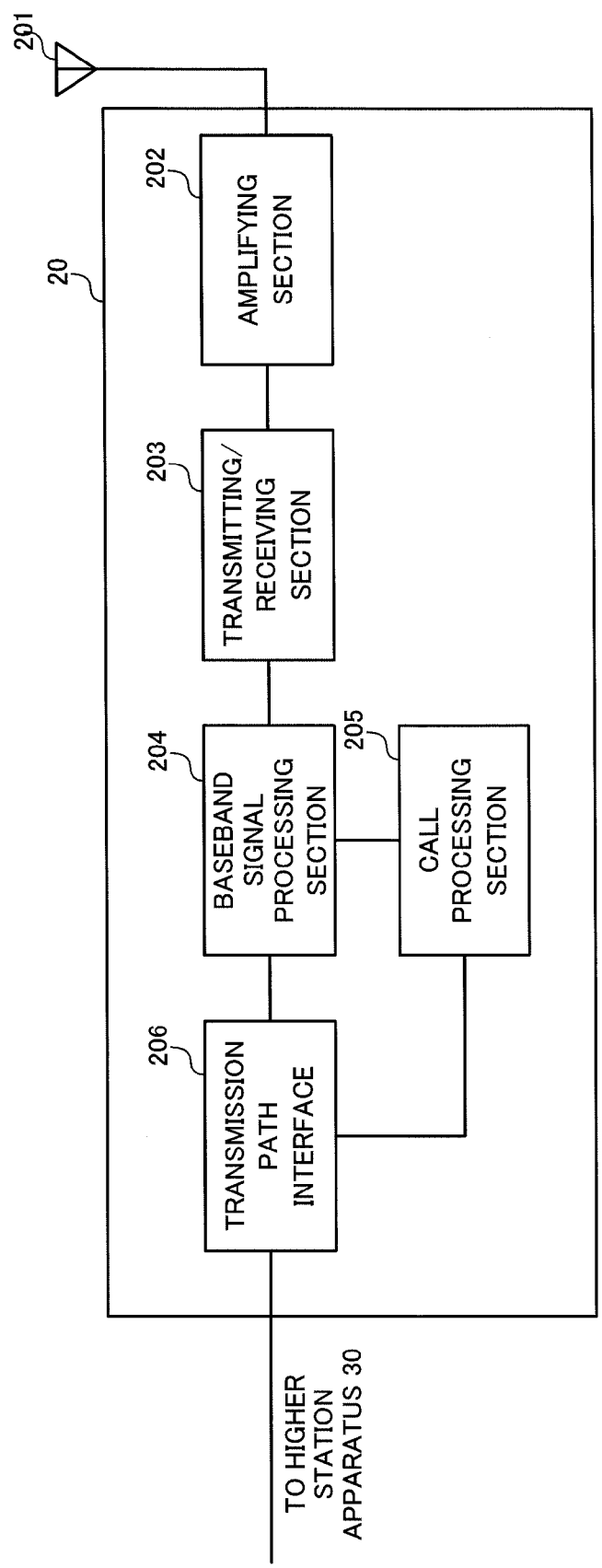
FIG. 6 is a diagram to explain an overall configuration of a radio base station apparatus.

FIG. 6 is a block diagram showing an overall configuration of a radio base station apparatus according to the present embodiment. The radio base station apparatus 20 includes a transmitting/receiving antenna 201, an amplifying section 202, a transmitting/receiving section 203, a baseband signal processing section 204, a call processing section 205, and a transmission path interface 206. Transmission data to be transmitted from the radio base station apparatus 20 to the mobile terminal apparatus 10 on the downlink is input from the higher station apparatus 30, into the baseband signal processing section 204, via the transmission path interface 206.

In the baseband signal processing section 204, a downlink data channel signal is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, as for the signal of the physical downlink control channel, which is a downlink control channel, transmission processes such as channel coding and an inverse fast Fourier transform are performed.

Also, the baseband signal processing section 204 reports control information for allowing each mobile terminal apparatus 10 to perform radio communication with the radio base station apparatus 20, to the mobile terminal apparatuses 10, by a broadcast channel. Information for communication in the cells includes, for example, the system bandwidth on the uplink and the downlink, identification information of a root sequence (root sequence index) for generating signals of random access preambles of the PRACH (Physical Random Access Channel), and so on.

A baseband signal that is output from the baseband signal processing section 204 is converted into a radio frequency band in the transmitting/receiving section 203. The amplifying section 202 amplifies the radio frequency signal subjected to frequency conversion, and outputs the result to the transmitting/receiving antenna 201.

As for signals to be transmitted from the mobile terminal apparatus 10 to the radio base station apparatus 20 on the uplink, a radio frequency signal that is received in the transmitting/receiving antennas 201 is amplified in the amplifying section 202, converted into a baseband signal by frequency conversion in the transmitting/receiving section 203, and input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signal received on the uplink. The decoded signal is transferred to the higher station apparatus 30 through the transmission path interface 206.

The call processing section 205 performs call processing such as setting up and releasing communication channels, manages the state of the radio base station apparatus 20 and manages the radio resources.

Figure 7:
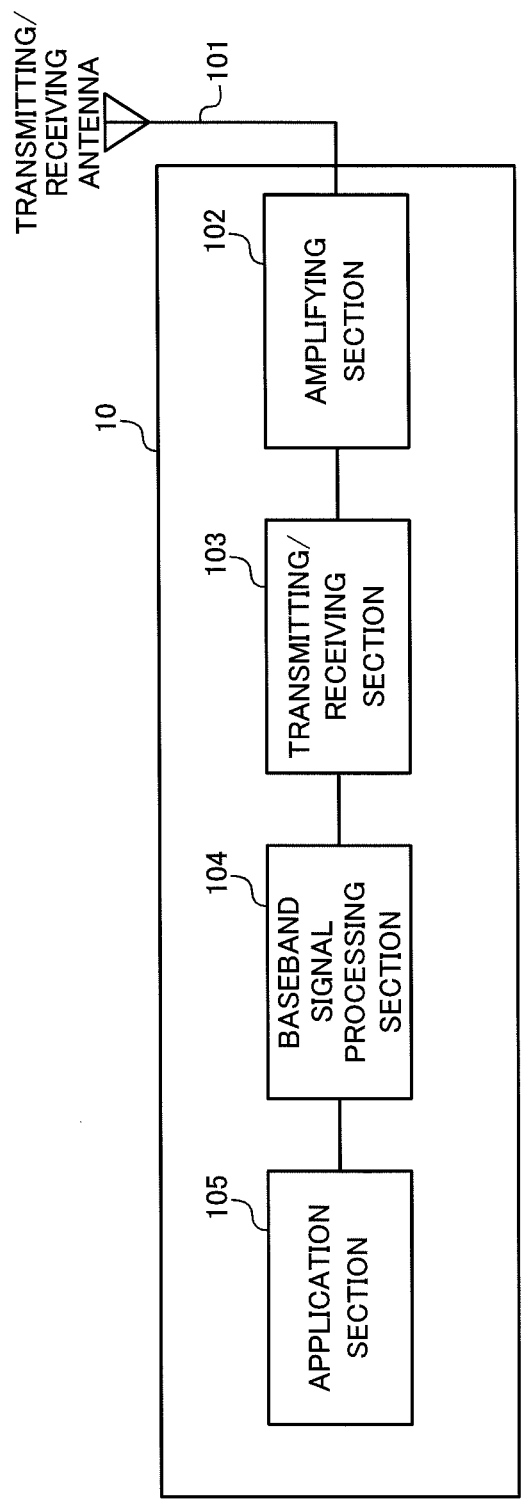
FIG. 7 is a diagram to explain an overall configuration of a mobile terminal apparatus.

FIG. 7 is a block diagram showing an overall configuration of the mobile terminal apparatus 10 according to the present embodiment. The mobile terminal apparatus 10 has a transmitting/receiving antenna 101, an amplifying section 102, a transmitting/receiving section 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 to the baseband signal processing section 104. The baseband signal processing section 104 performs a mapping process, a retransmission control (HARQ) transmission process, channel coding, a DFT process, and an IFFT process. The baseband signal that is output from the baseband signal processing section 104 is converted into a radio frequency band in the transmitting/receiving section 103. After that, the amplifying section 102 amplifies the radio frequency signal having been subjected to frequency conversion, and transmits the result from the transmitting/receiving antenna 101.

Figure 8:
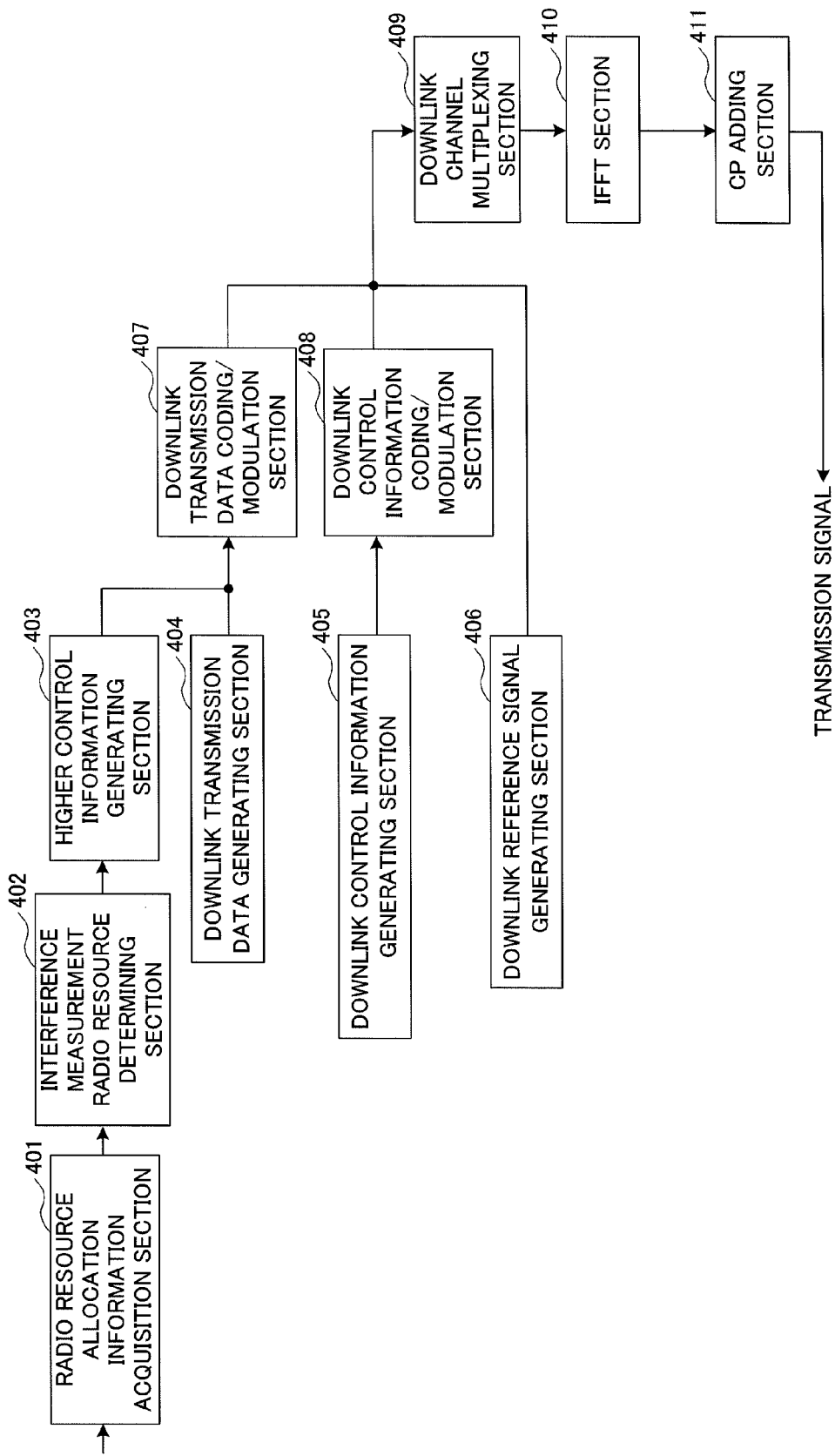
FIG. 8 is a detailed functional block diagram of a radio base station apparatus.

Detailed function blocks of the radio base station apparatus 20 will be described with reference to FIG. 8. Note that the function blocks of FIG. 8 primarily relate to the baseband processing section 204 shown in FIG. 6. Also, the function blocks shown in FIG. 6 are simplified to explain the present invention, and assumed to have the configurations which a baseband processing section 204 should normally have.

The radio base station apparatus 20 has, as components on the transmitting side, a radio resource allocation information acquisition section (acquisition section) 401, an interference measurement radio resource determining section (determining section) 402, a higher control information generating section 403, a downlink transmission data generating section 404, a downlink control information generating section 405, a downlink reference signal generating section 406, a downlink transmission data coding/modulation section 407, and a downlink control information coding/modulation section 408. Also, the radio base station apparatus 20 has a downlink channel multiplexing section 409, an IFFT section 410, and a CP adding section 411.

The radio resource allocation information acquisition section 401 acquires radio resource allocation information, which indicates radio resource information allocated by radio base station apparatuses to serve as other transmission points, and reports this information to the interference measurement radio resource determining section 402. That is to say, the radio resource allocation information acquisition section 401 acquires, from a plurality of transmission points, radio resource allocation information, which shows the signal transmission state at each transmission point, over the entire system band. For example, from other radio base station apparatuses that are connected via a backhaul link (X2 interface), the radio resource allocation information acquisition section 401 acquires the RNTPs to show the transmission power in each radio base station apparatus, as radio resource allocation information, and reports this information to the interference measurement radio resource determining section 402.

The RNTP is an indicator to show transmission power, and its value varies depending on the situation of radio resource allocation at each transmission point. For example, when the RNTP indicates high power transmission, the target radio resource at the target transmission point assumes a state of being allocated. When the RNTP indicates low power transmission, the target radio resource at the target transmission point assumes a state of not being allocated. Consequently, by means of the RNTPs reported from the radio base station apparatuses to serve as other transmission points via a backhaul link, the radio base station apparatus 20 is able to learn the situation of radio resource allocation at other transmission points.

The interference measurement radio resource determining section 402 determines subband patterns that indicate subbands to have the same signal transmission state between a plurality of transmission points, based on the radio resource allocation information acquired in the radio resource allocation information acquisition section 401, and reports these to the higher control information generating section 403. For example, the interference measurement radio resource determining section 402 determines subbands where the RNTPs reported from all the transmission points indicate high power transmission, to be subbands having the same signal transmission state. When interference measurement is executed in the first mode, the interference measurement radio resource determining section 402 reports the bandwidths and frequency positions for designating the determined subbands of the same signal transmission state, to the higher control information generating section 403. When interference measurement is executed in the second mode, the interference measurement radio resource determining section 402 reports the frequency positions for designating the determined subbands of the same signal transmission state, to the higher control information generating section 403.

The higher control information generating section 403 generates higher control information to be transmitted by higher layer signaling (for example, RRC signaling), and outputs the generated higher control information to the downlink transmission data coding/modulation section 407. To be more specific, the higher control information generating section 403 generates higher control information, which includes information related to a subband pattern indicating subbands having the same signal transmission state between a plurality of transmission points. The generated higher control information is output to the downlink transmission data coding/modulation section 407.

The downlink transmission data generation section 404 generates downlink transmission data, and outputs that downlink transmission data to the downlink transmission data coding/modulation section 407.

The downlink control information generating section 405 generates downlink control information, and outputs the downlink control information to the downlink control information coding/modulation section 408.

The downlink transmission data coding/modulation section 407 performs channel coding and data modulation for the downlink transmission data and higher control information, and outputs the results to the downlink channel multiplexing section 409. The downlink control information coding/modulation section 408 performs channel coding and data modulation for the downlink control information and outputs the result to the downlink channel multiplexing section 409.

The downlink reference signal generating section 406 generates downlink reference signals (CRS, CSI-RS, and DM-RS), and outputs these downlink reference signals to the downlink channel multiplexing section 409.

The downlink channel multiplexing section 409 combines the downlink control information, the downlink reference signals, and the downlink transmission data (including higher control information), and generates a transmission signal. The downlink channel multiplexing section 409 outputs the generated transmission signal to the IFFT (Inverse Fast Fourier Transform) section 410. The IFFT section 410 performs an IFFT of the transmission signal, and outputs the transmission signal after the IFFT to the CP adding section 411. The CP adding section 411 adds CPs (Cyclic Prefixes) to the transmission signal after the IFFT, and outputs the transmission signal, to which CPs have been added, to the transmitting/receiving section 203 shown in FIG. 6.

Figure 9:
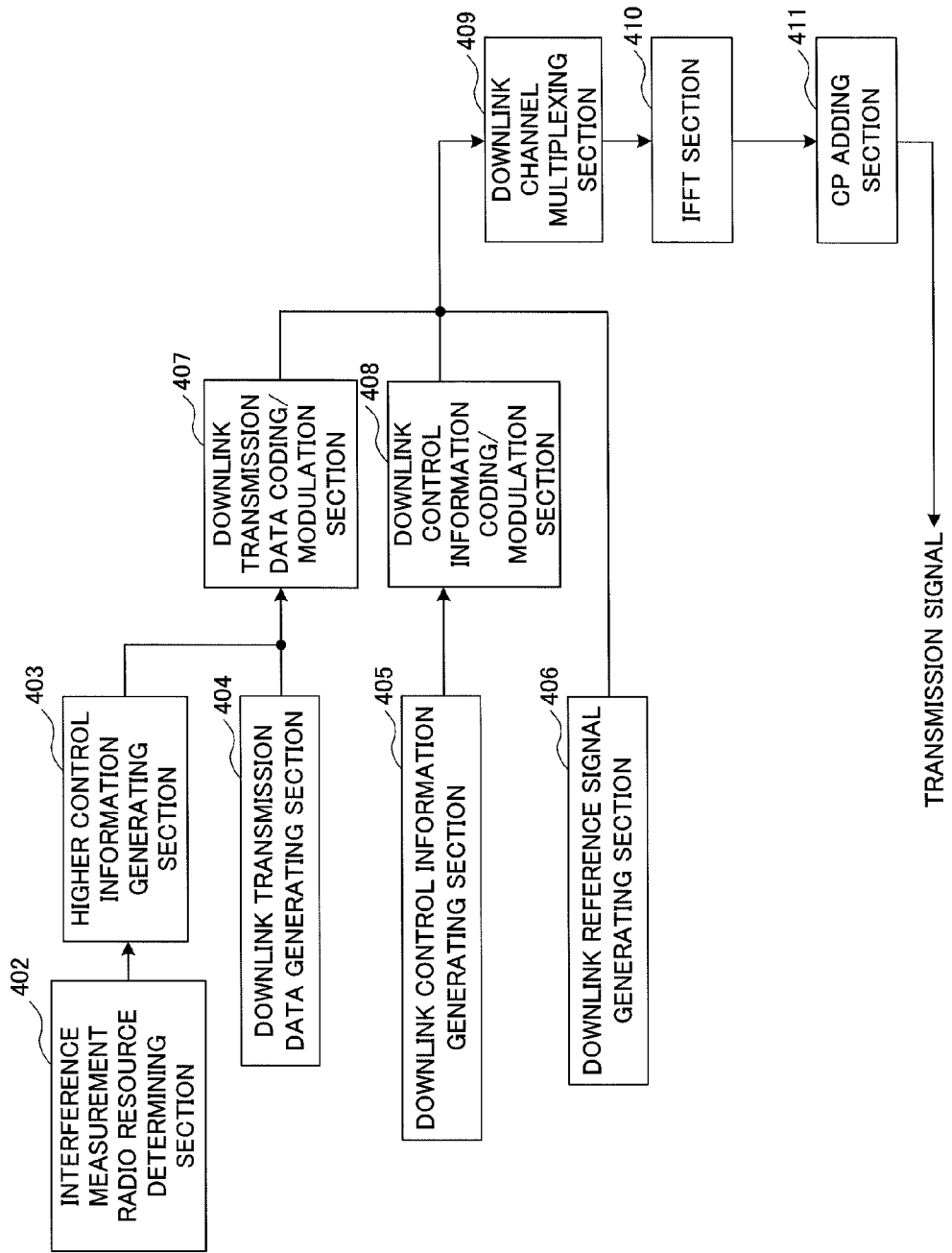
FIG. 9 is a detailed functional block diagram of a radio base station apparatus according to a modified example.

Note that, when the radio base station apparatus 20 is able to determine a subband pattern without acquiring radio resource allocation information, such as when radio resource allocation is determined in advance in radio base station apparatuses to serve as other transmission points, the radio base station apparatus 20 does not have to have the radio resource allocation information acquisition section 401. FIG. 9 shows detailed function blocks of a radio base station apparatus 20 without a radio resource allocation information acquisition section. Parts in FIG. 9 that are the same as in FIG. 8 will be assigned the same codes as in FIG. 8 and their detailed descriptions will be omitted.

Figure 10:
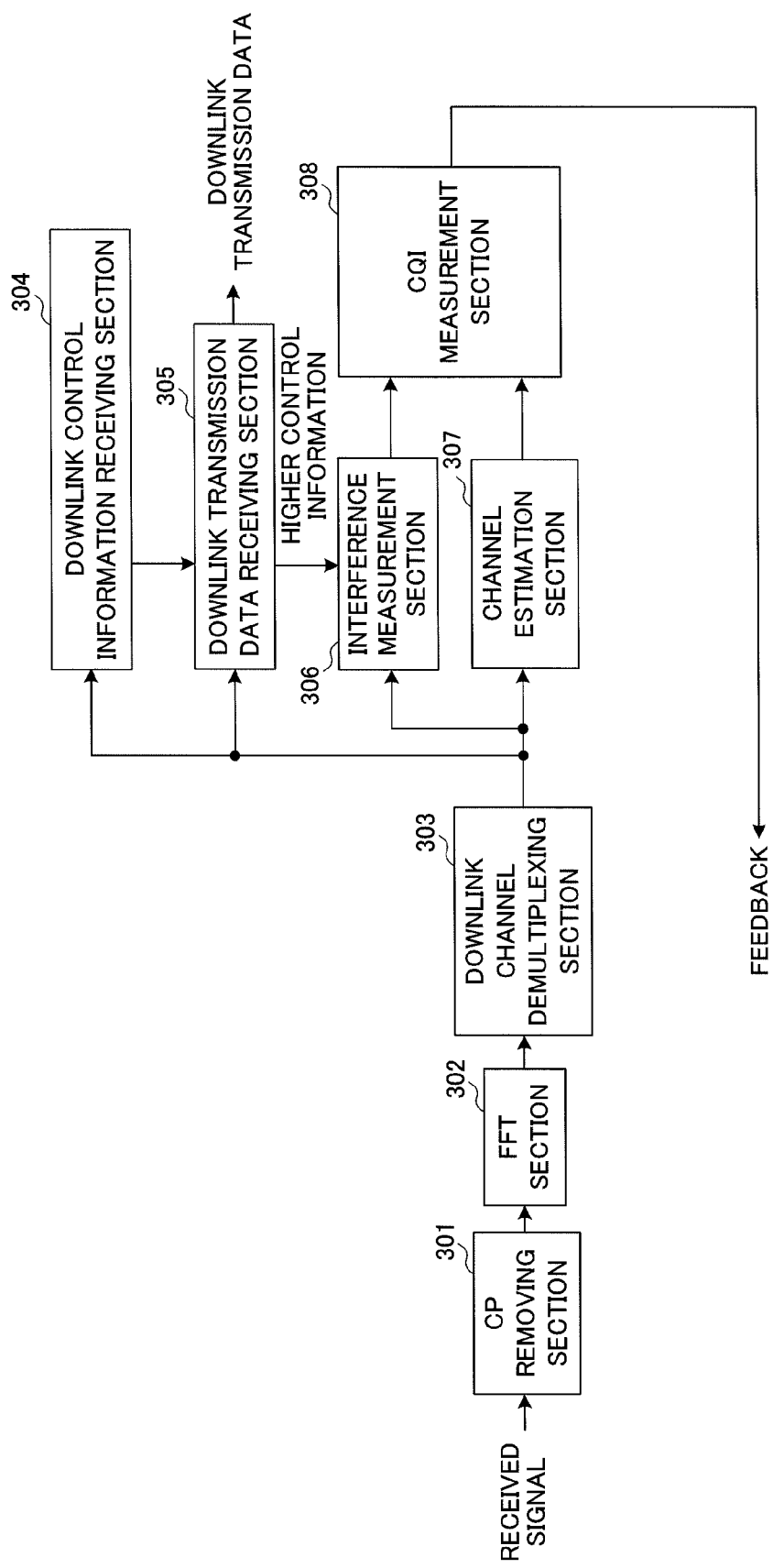
FIG. 10 is a detailed functional block diagram of a mobile terminal apparatus.

The function blocks of a mobile terminal apparatus 10 will be described with reference to FIG. 10. Note that the function blocks of FIG. 10 primarily relate to the baseband processing section 104 shown in FIG. 7. Also, the function blocks shown in FIG. 10 are simplified to explain the present invention, and assumed to have the configurations which a baseband processing section should normally have.

The mobile terminal apparatus 10 has, as components of the receiving side, a CP removing section 301, an FFT section 302, a downlink channel demultiplexing section 303, a downlink control information receiving section 304, a downlink transmission data receiving section 305, an interference measurement section 306, a channel estimation section 307, and a CQI measurement section 308.

A transmission signal that is transmitted from the radio base station apparatus 20 is received in the transmitting/receiving antenna 101 shown in FIG. 7, and is output to the CP removing section 301. The CP removing section 301 removes the CPs from the received signal and outputs the result to the FFT section 302. The FFT section 302 performs a fast Fourier transform (FFT: Fast Fourier Transform) of the signal, from which the CPs have been removed, and converts the time domain signal into a frequency domain signal. The FFT section 302 outputs the signal converted into a frequency domain signal to the downlink channel demultiplexing section 303.

The downlink channel demultiplexing section 303 demultiplexes the downlink channel signal into the downlink control information, the downlink transmission data (including higher control information), and the downlink reference signals. The downlink channel demultiplexing section 303 outputs the downlink control information to the downlink control information receiving section 304, outputs the downlink transmission data and the higher control information to the downlink transmission data receiving section 305, and outputs the downlink reference signals to the interference measurement section 306 and the channel estimation section 307.

The downlink control information receiving section 304 demodulates the downlink control information, and outputs the demodulated downlink control information to the downlink transmission data receiving section 305. The downlink transmission data receiving section 305 demodulates the downlink transmission data using the demodulated downlink control information. Also, the downlink transmission data receiving section 305 demodulates the higher control information included in the downlink transmission data and outputs the result to the interference measurement section 306. This higher control information includes information related to a subband pattern to indicate subbands having the same signal transmission state between a plurality of transmission points.

The interference measurement section 306 performs interference measurement according to the first mode or the second mode, using transmission signals (for example, downlink reference signals such as the CRSs, the CSI-RSs and so on) transmitted from other transmission points. When interference measurement is executed in the first mode, interference measurement is performed in all bands using transmission signals transmitted from other transmission points, and the interference measurement results are averaged per subband designated by the bandwidth and frequency position reported by higher control information. When interference measurement is executed in the second mode, interference measurement is performed in all bands using transmission signals transmitted from other transmission points, and the interference measurement results are averaged per subband designated by the frequency position reported by higher control information. The interference measurement section 306 reports the measurement results to the CQI measurement section 308. Note that interference measurement may also be performed using downlink transmission data transmitted from other transmission points. Also, it is equally possible to transmit the CSI-RS with zero power (non-transmission) from the connecting transmission point, and directly measure the interference from other transmission points.

The channel estimation section 307 estimates the channel state based on the downlink reference signals transmitted from the connecting transmission point such as the CRS, the CSI-RS and so on, and reports the result to the CQI measurement section 308. The CQI measurement section 308 calculates the CQI based on the interference measurement results reported from the interference measurement section 306 and the channel estimation result reported from the channel estimation section 307. The CQI calculated in the CQI measurement section 308 is reported to the radio base station apparatus 20 as feedback information.

In the radio communication system 1 of the above configuration, first, the radio base station apparatus 20 to serve as the connecting transmission point acquires radio resource allocation information of other transmission points via a backhaul link. Next, the radio base station apparatus 20 determines subbands where the signal transmission state is the same, based on the radio resource allocation information of other transmission points, and reports that subband pattern to the mobile terminal apparatus 10 by a higher control signal. Also, the radio base station apparatus 20 to serve as the connecting transmission point transmits downlink reference signals to use for channel estimation such as the CRS, the CSI-RS and so on.

When the first mode is adopted, the radio base station apparatus 20 reports the bandwidths and frequency positions of subbands where the signal transmission state is the same, to the mobile terminal apparatus 10. When the second mode is adopted, the radio base station apparatus 20 reports the frequency positions of subbands where the signal transmission state is the same, to the mobile terminal apparatus 10. When subbands having the same signal transmission state are reported in this way, the mobile terminal apparatus 10 averages the interference measurement results measured in resource block units, in the reported subbands. Also, the mobile terminal apparatus 10 performs channel estimation. Then, the mobile terminal apparatus 10 calculates the CQI using the interference measurement results and the channel estimation result. The calculated CQI is fed back to the radio base station apparatus 20.

As described above, with the interference measurement method according to the present invention, a radio base station apparatus to serve as a connecting transmission point reports radio resources having the same radio resource allocation pattern at other transmission points to a mobile terminal apparatus (user terminal), so that the mobile terminal apparatus (user terminal) is able to average the interference measurement results per band suitable for averaging. By this means, it is possible to improve the accuracy of interference measurement.

The present invention is not limited to the description given herein, and can be implemented in various modifications. For example, in a radio communication system, it is possible to switch between the first mode and the second mode depending on the situation of radio resource allocation at other transmission points. In this case, for example, an interference measurement radio resource determining section determines which one of the first mode and the second mode to use, based on radio resource allocation information of other transmission points. This determination can be reported to a mobile terminal apparatus (user terminal) by, for example, higher control information.

Also, the relationships of connection, functions and so on of the components described herein may be implemented with various changes. Also, the configurations shown herein can be implemented in various adequate combinations. In addition, the present invention can be implemented in various modifications without departing from the spirit of the present invention.

The disclosure of Japanese Patent Application No. 2011-244513, filed on Nov. 8, 2011, including the specification, drawings and abstract, is incorporated herein by reference in its entirety.

The invention claimed is:

1. A radio communication system comprising a user terminal in communication with a radio base station apparatus, wherein:
the radio base station apparatus comprises:
an acquisition software module that acquires, from a plurality of other transmission points, radio resource allocation information to represent a signal transmission state at each other transmission point, over an entire system band;
a determining software module that determines radio resources having the same radio resource subband allocation pattern at the plurality of other transmission points, based on the acquired radio resource allocation information; and
a transmission section that transmits a reporting signal to indicate the determined radio resource subband allocation pattern to the user terminal; and
the user terminal comprises:
a receiving section that receives the reporting signal and acquires the radio resource subband allocation pattern; and
an interference measurement software module that performs interference measurement over the entire system band, and, in the interference measurement, averages interference measurement results in radio resource subbands, based on the radio resource subband allocation pattern.

2. The radio communication system according to claim 1, wherein the determining software module determines a radio resource subband allocation pattern, in which a bandwidth of each radio resource subband is changed depending on a bandwidth for which the radio resources have the same radio resource subband allocation pattern at the plurality of other transmission points.

3. The radio communication system according to claim 1, wherein the determining software module determines a radio resource subband allocation pattern, in which one radio resource subband or a plurality of radio resource subbands of a fixed bandwidth continue, depending on the bandwidth, for which the radio resources have the same radio resource subband allocation pattern at the plurality of other transmission points.

4. The radio communication system according to claim 1, wherein the reporting signal is reported from the radio base station apparatus to the user terminal by higher layer signaling.

5. The radio communication system according to claim 1, wherein the acquisition software module acquires, from the plurality of transmission points, radio resource allocation information of each other transmission point, via a backhaul link.

6. An interference measurement method for measuring interference in a user terminal in communication with a radio base station apparatus, the method comprising the steps of:
acquiring by the radio base station apparatus, from a plurality of other transmission points, radio resource allocation information to represent a signal transmission state at each other transmission point, over an entire system band;
determining by the radio base station apparatus, radio resources having the same radio resource subband allocation pattern at the plurality of other transmission points, based on the acquired radio resource allocation information;
transmitting by the radio base station apparatus, a reporting signal to indicate the determined radio resource subband allocation pattern to the user terminal;
receiving by the user terminal, the reporting signal and acquiring by the user terminal, the radio resource subband allocation pattern; and
performing by the user terminal, interference measurement over the entire system band, and, in the interference measurement, averaging by the user terminal, interference measurement results in radio resource subbands, based on the radio resource subband allocation pattern.

7. A radio base station apparatus in communication with a user terminal to measure interference, the radio base station apparatus comprising:
an acquisition software module that acquires, from a plurality of other transmission points, radio resource allocation information to represent a signal transmission state at each other transmission point, over an entire system band;
a determining software module that determines radio resources having the same radio resource subband allocation pattern at the plurality of other transmission points, based on the acquired radio resource allocation information; and
a transmission section that transmits a reporting signal to indicate the determined radio resource subband allocation pattern to the user terminal, wherein
a receiving section of the user terminal receives the reporting signal and acquires the radio resources sub-band allocation pattern.

8. A user terminal in communication with a radio base station apparatus, the user terminal comprising:
a receiving section that receives a reporting signal to indicate a radio resource subband allocation pattern that indicates radio resource subbands for which radio resources have the same radio resource subband allocation pattern at a plurality of other transmission points;
an interference measurement software module that performs interference measurement over an entire system band, and, in the interference measurement, averages interference measurement results in radio resource subbands, based on the radio resource subband allocation pattern; and
a transmission section that transmits a signal to the radio base station apparatus.

\* \* \* \* \*